(12) United States Patent
Harrison

(10) Patent No.: US 9,948,163 B2
(45) Date of Patent: Apr. 17, 2018

(54) IN-LINE CONVEYOR BELT ROLLER GENERATOR WITH MAGNETIC TORQUE LIMITING COUPLING

(71) Applicant: Martin Engineering Company, Neponset, IL (US)

(72) Inventor: Paul B. Harrison, Neponset, IL (US)

(73) Assignee: Martin Engineering Company, Neponset, IL (US)

( * ) Notice: Subject to any disclaimer, the term of this patent is extended or adjusted under 35 U.S.C. 154(b) by 0 days.

(21) Appl. No.: 15/605,045

(22) Filed: May 25, 2017

(65) Prior Publication Data

US 2017/0264166 A1    Sep. 14, 2017

Related U.S. Application Data

(63) Continuation of application No. 14/640,810, filed on Mar. 6, 2015, now abandoned.

(51) Int. Cl.
*B65G 39/02* (2006.01)
*H02K 7/18* (2006.01)

(52) U.S. Cl.
CPC ........... *H02K 7/1846* (2013.01); *B65G 39/02* (2013.01); *H02K 7/1807* (2013.01)

(58) Field of Classification Search
None
See application file for complete search history.

(56) References Cited

U.S. PATENT DOCUMENTS

| | | | |
|---|---|---|---|
| 1,725,740 | A | 8/1929 | Schulte |
| 3,918,561 | A | 11/1975 | Isacsson |
| 3,987,307 | A | 10/1976 | Giconi |
| 4,823,941 | A | 4/1989 | Mindich |
| 5,836,440 | A | 11/1998 | Mindich |
| 5,970,712 | A | 10/1999 | Stein |
| 6,206,181 | B1 | 3/2001 | Syverson |
| 6,244,427 | B1 | 6/2001 | Syverson |
| 6,443,295 | B1 | 9/2002 | Hill |
| 6,527,097 | B2 | 3/2003 | Dreyer |
| 6,612,422 | B2 | 9/2003 | Roberts et al. |
| 7,510,073 | B2 | 3/2009 | Kanaris |
| 7,750,253 | B2 | 7/2010 | Wineland |
| 8,348,813 | B2 | 1/2013 | Huang |
| 8,531,049 | B2 | 9/2013 | Rosendall |
| 2007/0215391 | A1 | 9/2007 | Wineland |
| 2009/0033166 | A1 | 2/2009 | Takeuchi et al. |
| 2009/0135019 | A1 | 5/2009 | Smith |
| 2009/0166157 | A1 | 7/2009 | Kratz et al. |
| 2011/0266091 | A1 | 11/2011 | Taylor |
| 2012/0248787 | A1 | 10/2012 | Reist |
| 2014/0346906 | A1 | 11/2014 | Paulides et al. |

*Primary Examiner* — Tulsidas C Patel
*Assistant Examiner* — S. Mikailoff
(74) *Attorney, Agent, or Firm* — Thompson Coburn LLP

(57) ABSTRACT

A generator comprises a stator having a center axis and a rotor. The stator is configured and adapted to be supported by a portion of conveyor belt support structure. The stator comprises an opening aligned with the center axis configured and adapted to receive at least a portion of a shaft of a conveyor belt roller. The rotor is configured and adapted to connect to the conveyor belt roller in a manner such that the rotor and conveyor belt roller can collectively rotate about the center axis. The rotor encircles the stator and comprises a plurality of permanent magnets.

9 Claims, 5 Drawing Sheets

IN-LINE CONVEYOR BELT ROLLER GENERATOR WITH MAGNETIC TORQUE LIMITING COUPLING

CROSS-REFERENCE TO RELATED APPLICATIONS

This application is a continuation of U.S. patent application Ser. No. 14/640,810, filed Mar. 6, 2015, and which is currently pending.

STATEMENT REGARDING FEDERALLY SPONSORED RESEARCH OR DEVELOPMENT

Not Applicable.

APPENDIX

Not Applicable.

BACKGROUND OF THE INVENTION

Field of the Invention

This invention pertains to electrical generators and methods related to the same. More specifically, the present invention pertains to a generator configured to attach to a conveyor belt roller of a bulk material conveyor belt assembly in a manner such that the roller rotationally drives the generator.

GENERAL BACKGROUND

There is often a need to supply electricity to various points along a bulk material conveyor belt assembly for a variety of purposes. One such purpose is to monitor the performance of various components of the conveyor belt assembly. But some bulk material conveyor belt assemblies are many miles long. Due to the extreme length of such conveyor belt assemblies, it is often not practical to supply electricity along the entire length of the conveyor belt by running electrical wires.

To address this problem, generators driven by the motion of conveyor belts have been used. In some cases, an idler roller of the conveyor belt assembly has been replaced with a special roller retrofitted with a generator inside. However, utilizing such special rollers within the conveyor belt assembly has several drawbacks. It requires the manufacturing and production of a special type of roller. Additionally, if the generator within the specialized roller seizes, the roller could stop operating properly and/or friction could create risk of fire.

In other cases, standard generators have been driven via conveyor belts by placing various driven shafts for transferring mechanical energy to the generators. However, such a configuration also has several significant drawbacks. The conveyor belt assembly is often carrying dusty bulk material such as ore. Consequently, the dust tends to build up on the drive shaft and generator. This often results in a plurality of operational issues that ultimately result in the failure of the generator.

SUMMARY OF THE INVENTION

The present invention addresses and overcomes some of the problems that currently exist in conveyor belt assemblies that utilize generators. The generator of the present invention is directly connected to a conventional conveyor belt idler roller. Furthermore, the rotor of the generator is preferably configured to rotationally slip relative to that idler roller in the event the resistive torque between the rotor and stator of the generator exceeds a threshold torque or the generator completely seizes. This and other advantages are provided by the present invention.

In one aspect of the invention, a generator for generating electricity from a rotating conveyor belt roller of a bulk material conveyor belt assembly comprises a stator and a rotor. The stator has a center axis and is configured and adapted to be supported by a portion of conveyor belt support structure from a first axial end of the stator. The stator has an opposite second axial end that is configured and adapted to support an end of a conveyor belt roller in a manner such that the stator is able to structurally support the end of the conveyor belt roller from the portion of conveyor belt support structure. The stator further comprises armature windings spaced circumferentially about the center axis. The rotor encircles the stator and is configured and adapted to operatively connect to the conveyor belt roller in a manner such that the rotor can be rotationally driven by the conveyor belt roller about the stator. The rotor comprises a plurality of permanent magnets spaced circumferentially about the center axis of the stator.

In another aspect of the invention, a conveyor belt roller has a main body and a generator. The main body has a cylindrical outer surface that is configured and adapted to engage a conveyor belt of a conveyor belt assembly and that defines an axis of rotation. The generator is connected to an axial end portion of the main body and comprises a stator and a rotor. The rotor is configured and adapted to rotate relative to the stator about the axis of rotation. The stator comprises a plurality of armature windings circumferentially spaced around the axis of rotation. The rotor comprises a cylindrical outer surface and a plurality of permanent magnets. The cylindrical outer surface of the rotor and the cylindrical outer surface of the main body have equal diameters. The permanent magnets are circumferentially spaced around the axis of rotation. The cylindrical outer surface of the rotor and the permanent magnets encircle the armature windings of the stator. The main body is connected to the rotor in a manner such that rotation of the roller can rotationally drive the rotor relative to the stator.

Yet another aspect of the invention is directed to supporting a conveyor belt roller from support structure via a generator. The generator comprises a rotor and a stator. The rotor is configured to rotate around the stator. The method comprises supporting an axial end portion of the conveyor belt roller via an axial end portion of the stator. The method further comprises supporting an opposite axial end of the stator from the support structure in a manner such that the stator indirectly supports the conveyor belt roller from the support structure.

Further features and advantages of the present invention, as well as the operation of the invention, are described in detail below with reference to the accompanying drawings.

Figure 1:
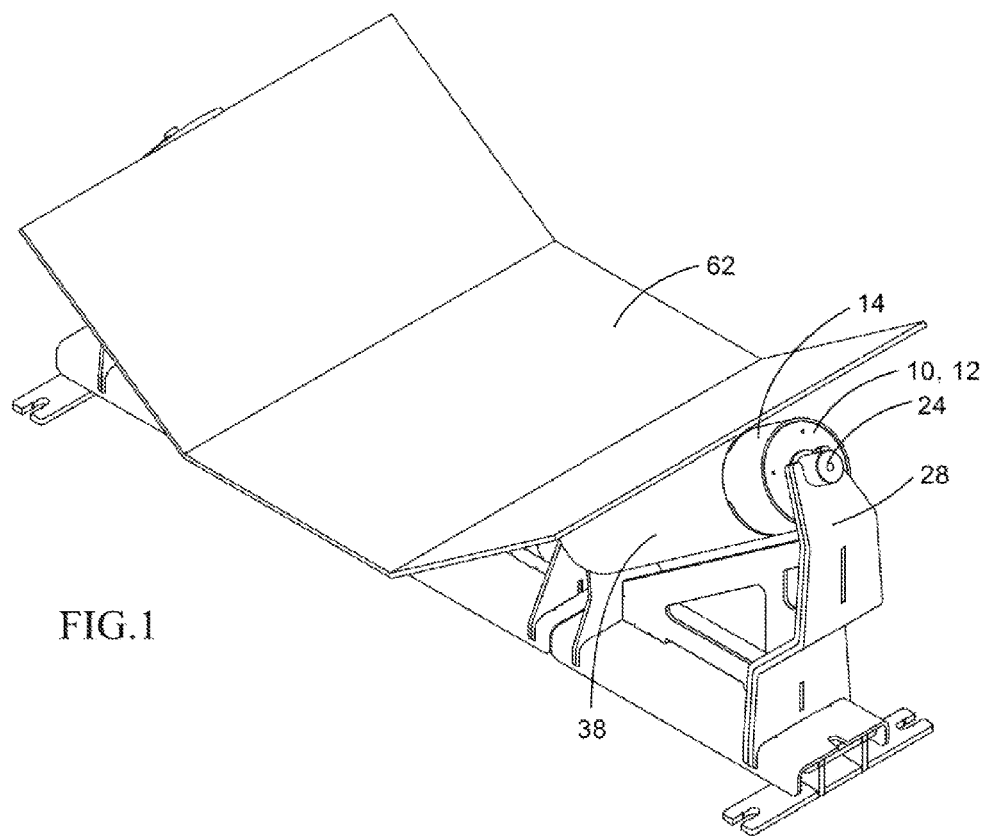
FIG. 1 depicts a perspective view of a portion of conveyor belt assembly incorporating a generator in accordance with the present invention.
Figure 2:
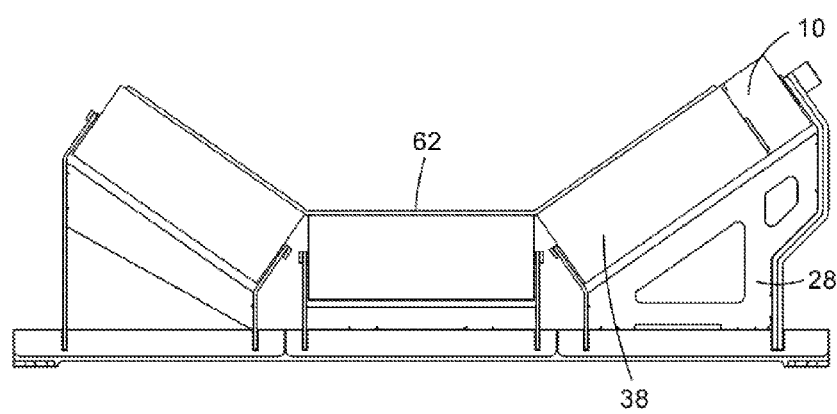
FIG. 2 depicts a front view of the conveyor belt assembly shown in FIG. 1.
Figure 3:
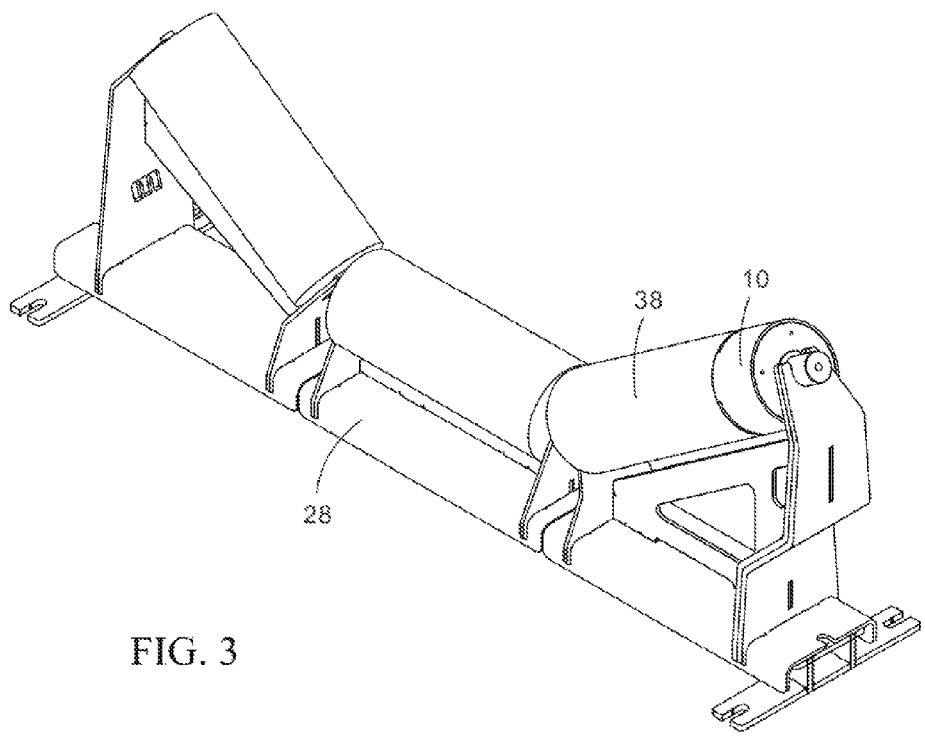
FIG. 3 depicts a perspective view of the conveyor belt assembly shown in FIGS. 1 and 2 with the conveyor belt omitted for clarity.
Figure 4:
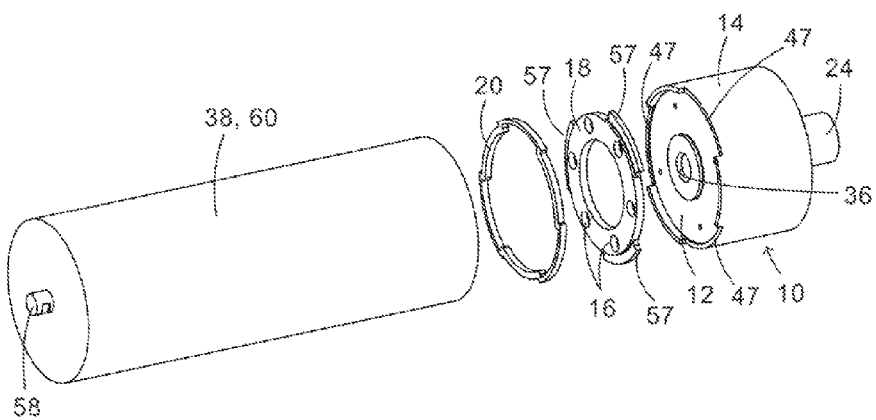
FIG. 4 depicts an exploded view of the generator and roller assembly shown in FIGS. 1-3.
Figure 5:
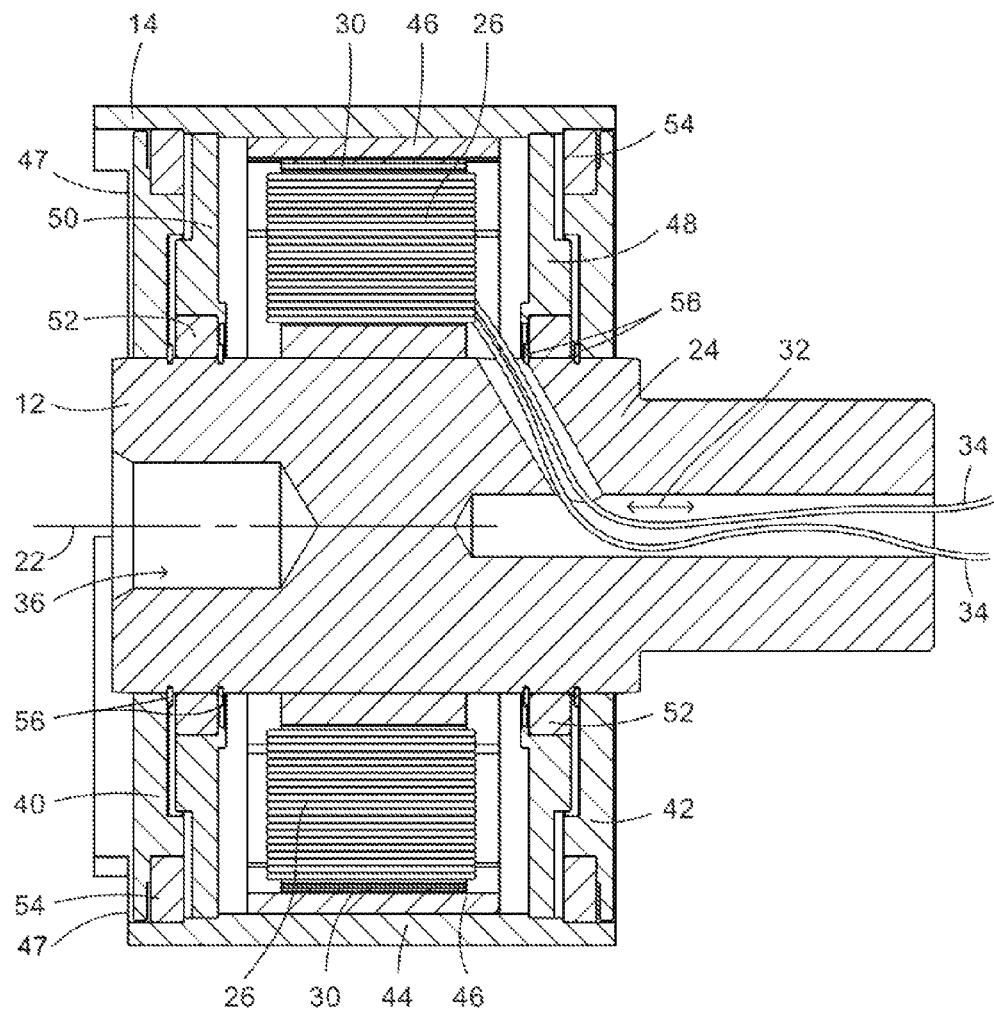
FIG. 5 depicts a cross-sectional view of the generator shown in FIGS. 1-4.
Figure 6:
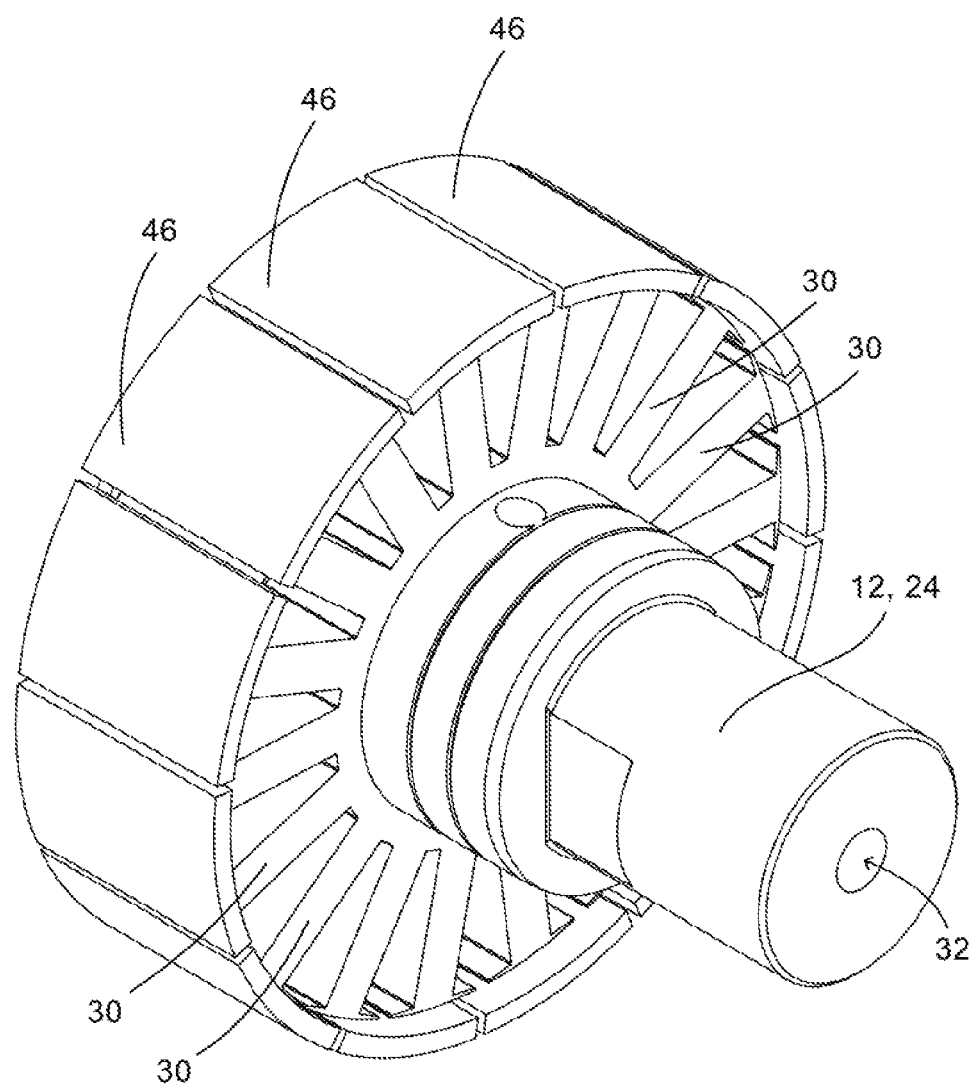
FIG. 6 depicts a perspective view of part of the stator encircled by the permanent magnets or the rotor.
Figure 7:
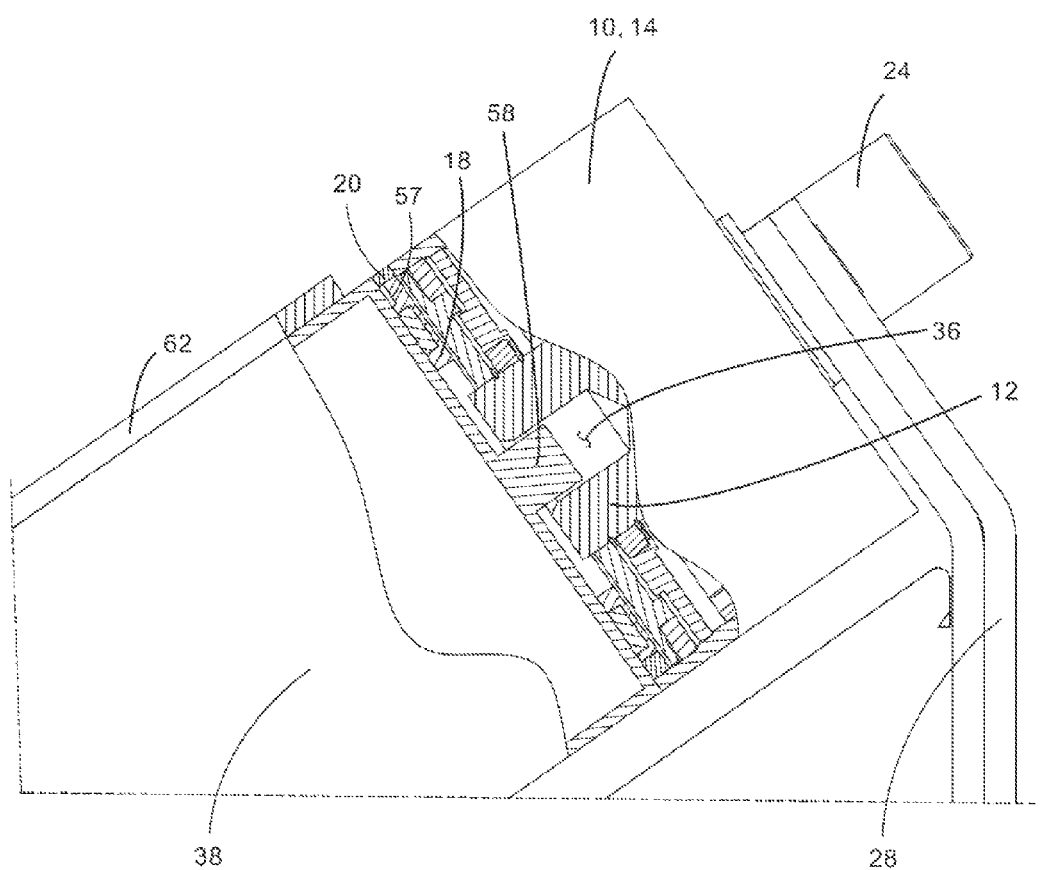
FIG. 7 depicts a partial cutaway detail view of FIG. 2 showing the drive dog of the generator geometrically interlocked with the rotor and the shaft of the roller positioned in the recess of the stator.

Reference numerals in the written specification and in the drawing figures indicate corresponding items.

DETAILED DESCRIPTION

A preferred embodiment of a generator 10 in accordance with the present invention is shown in the figures. The generator 10 comprises a stator 12 and a rotor 14. Preferably, the generator 10 further comprises a plurality of permanent drive magnets 16, a drive dog 18, and a drive coupling 20.

The stator 12 comprises a center axis 22, a central shaft 24, and armature windings 26. The stator 12 is configured and adapted to be supported by a rigid portion of conveyor belt support structure 28. Preferably, the stator 12 is supported by the portion of conveyor belt support structure 28 via the shaft 24 of the stator. The armature windings 26 are wound around armature teeth 30 that extend from and around the shaft 24 of the stator 12. An axial passageway 32 extends through the shaft 24 of the stator 12 and serves as a conduit for lead wires 34 that are connected to the windings 26. The lead wires 34 extend from the generator 12 to transmit electricity out of the generator. The opposite axial end of the shaft 24 of the stator 12 comprises a recess 36 that is aligned with the center axis 22. The recess 36 is configured and adapted to receive and support the end of a shaft of a conveyor belt roller 38 (as is explained in greater detail below) and can be cylindrical, hexagonal, or any other shape suitable for supporting the end of the shaft. Thus, the stator 12 is adapted to support one of a conveyor belt roller from conveyor belt support structure. The stator 12 preferably further comprises a first end cap 40 and a second end cap 42 that are rigidly attached to the shaft 24 of the stator 12 (preferably via press-fit or adhesive).

The rotor 14 comprises an outer cylindrical casing 44 and a plurality of permanent magnets 46. The permanent magnets 46 are attached to the inner surface of the cylindrical casing 44 and are circumferentially spaced from each other around the center axis 22 of the stator 12. A plurality of recesses 47 are formed in one end of the casing 44. The rotor 14 further comprises a first inner cap 48 and an axially spaced second inner cap 50. The first and second inner end caps 48, 50 extend radially inward toward the shaft 24 of the stator 12, but stop short of engaging the shaft in a manner creating an annular gap.

Assembling the rotor 14 to the stator 12 includes the use of a pair of bearings 52, a pair of annular resilient seals 54 and a few c-clips/e-clips 56. Prior to assembling the rotor 14 to the stator 12, the inboard most c-clips 56 can be snapped into annular grooves formed in the shaft 24 of the stator. Then, with the stator 12 fully assembled except for its first and second end caps 40, 42, and with the rotor 14 fully assembled except for its first and second inner caps 48, 50, the rotor is axially slid around the stator. When axially in position, the permanent magnets 46 of the rotor 14 encircle the armature teeth 30 and windings 26 of the stator 12. Then the first and second inner caps 48, 50 of the rotor 14 can be slid into the cylindrical casing 44 of the rotor until they hit stops formed on the inner surface of the casing (which axially position the inner caps correctly). The inner caps 48, 50 preferably are then press-fit into to the cylindrical casing 44 (alternatively other methods of attaching the inner caps to the cylindrical casing can be used). Next, the bearings 52 are slipped into the annular gaps between the inner caps 48, 50 of the rotor and the shaft of the stator 12. The inboard c-clips 56 prevent the over insertion of the bearings 52. The outboard c-clips 56 can then be snapped into additional annular grooves formed in the shaft 24 of the stator 12 to axially secure the bearings 52 in place (which thereby also axially secures the rotor 14 in place relative to the stator 12). Additionally, at this stage, the seals 54 can be slid into the cylindrical casing 44 of the rotor 14 until they hit additional stops formed on the inner surface of the casing. With the foregoing done, the end caps 40, 42 of the stator can be axially press-fit onto the shaft 24 until they engage against outboard c-clips 56 (at which point they will also engage against and slightly compress the seals 54). With, the end caps 40, 42 press-fit onto the shaft 24, the process of assembling the rotor 14 to the stator 12 is complete.

The drive dog 18 is annular with radial protrusions 57 and the drive coupling 20 is configured to encircle the drive dog. Together, the radial protrusions 57 of the drive dog 18 and the drive coupling 20 are configured to interlock with the recesses 47 of the cylindrical casing 44 of the rotor 14. Thus, the rotor 14 is configured to rotate with the drive dog 18 relative to the stator 12. The drive coupling 20 is made of polyurethane or some other appreciably resilient material. In addition to absorbing oscillations in torque (described infra) the drive coupling is able to account for manufacturing tolerances between the protrusions 57 of the drive dog 18 and the recesses 47 of the cylindrical casing 44 of the rotor 14. The drive magnets 16 are secured in recesses formed in the axial side of the drive dog 18 that faces away from the rotor 14. The drive magnets 16 are preferably circumferentially spaced and encircle the center axis 22 of the stator 12.

The generator 10 is connected to a conveyor belt idler roller 38 (which is preferably axially symmetric) by inserting the shaft 58 of the roller 38 into the recess 36 formed in the shaft 24 of the stator 12. Following that, the drive magnets 16 magnetically attach the drive dog 18 to the main cylindrical body 60 of the roller 38 in a manner creating torsional friction between the roller and the drive. Hence, rotation of the roller 38 will cause the rotor 14 of the generator 10 to rotate therewith, unless the torsional friction is overcome be resistive torque. This allows the rotor 14 to rotationally slip relative to the roller 38 in the event the rotational friction between the rotor and the stator 12 exceeds the torsional friction.

The roller 38 and generator 10 assembly can then be secured to conveyor belt support structure 28 via the shaft 58 of the roller 38 and the shaft 24 of the stator 12. Thus, when secured to the conveyor belt support structure 28 one axial end of the shaft 58 of the roller 38 is supported directly by the support structure 28 and the other axial end of the shaft 58 of the roller 38 is supported by the structure indirectly through the stator 12 of the generator 10. Preferably, the cylindrical outer casing 44 of the rotor 14 has a diameter matching that of the cylindrical main body 60 of the roller 38 such that, if the conveyor belt 62 that rides on the roller 38 tracks off toward the generator 10, the belt can partially ride on the rotor 14 of the generator 10.

In view of the forgoing, it should be appreciated that as a conveyor belt rides over the roller 38, the rotor 14 of the generator 10 will rotate with the roller (unless it rotationally slips as discussed above), thereby generating alternating electrical current in the windings 26 of the stator 12 (which the lead wires transmit to whatever needs electrical power). As this occurs, the torque required to drive the rotor 14 around the stator 12 varies slightly depending on the rotational position of the magnets 46 of the rotor relative to the windings 26 of the stator. This uneven torque could create cogging between the drive-dog 18 and the casing 44 of the rotor 14 if such rigid components were directly engaged with each other. Such cogging could lead to rapid wear of the drive dog 18. However, because the drive coupling 20 is made of polyurethane, it is appreciably resilient and acts to absorb uneven torque between the drive dog 18 and the outer casing 48, thereby preventing such wear.

In view of the foregoing, it should be appreciated that the invention has several advantages over the prior art.

As various modifications could be made in the constructions and methods herein described and illustrated without departing from the scope of the invention, it is intended that all matter contained in the foregoing description or shown in the accompanying drawings shall be interpreted as illustrative rather than limiting. For example, although the drive dog of the preferred embodiment is distinct from the outer casing of the rotor, the drive dog could be formed in a manner such that it is integral with or permanently connected to the outer casing of the rotor. Alternatively, the drive dog could be an extension of the conveyor belt roller and configured to rotationally slip relative to the rotor. Still further, the generator can be formed in a manner such that the generator is integral with the conveyor belt roller. In such an embodiment, the rotor casing could be an integral extension of the main body of the roller. Thus, the breadth and scope of the present invention should not be limited by any of the above-described exemplary embodiments, but should be defined only in accordance with the following claims appended hereto and their equivalents.

It should also be understood that when introducing elements of the present invention in the claims or in the above description of exemplary embodiments of the invention, the terms "comprising," "including," and "having" are intended to be open-ended and mean that there may be additional elements other than the listed elements. Additionally, the term "portion" should be construed as meaning some or all of the item or element that it qualifies. Moreover, use of identifiers such as first, second, and third should not be construed in a manner imposing any relative position or time sequence between limitations. Still further, the order in which the steps of any method claim that follows are presented should not be construed in a manner limiting the order in which such steps must be performed, unless such an order is inherent.

What is claimed is:

1. A generator for generating electricity from a rotating conveyor belt roller of a bulk material conveyor belt assembly, the generator comprising:

a stator having a center axis and first and second axially opposite ends, the stator being configured and adapted to be supported by and fixed relative to a stationary portion of a conveyor belt support structure of the bulk material conveyor belt assembly from the first axial end of the stator, the second axial end of the stator being configured and adapted to support an end of a conveyor belt roller in a manner such that the stator is able to support the end of the conveyor belt roller from the stationary portion of the conveyor belt support structure, the stator further comprising armature windings spaced circumferentially about the center axis;

a rotor encircling the stator, the rotor being configured and adapted to operatively connect to the conveyor belt roller in a manner such that the rotor can be rotationally driven by the conveyor belt roller about the stator and relative to the stationary portion of the conveyor belt support structure, the rotor comprising a plurality of permanent magnets spaced circumferentially about the center axis of the stator; and at least one permanent drive magnet operatively connected to the rotor, the at least one drive magnet being configured and adapted to magnetically attach the rotor to the conveyor belt roller in a manner such that rotation of the conveyor belt roller is capable of rotating the rotor about the stator, the at least one drive magnet also being configured and adapted to allow the rotor to rotationally slip relative to the conveyor belt roller when torsional friction between the rotor and the stator exceeds a threshold.

2. The generator of claim 1 wherein the stator comprises electrical lead wires and a shaft that both extend axially from the first axial end of the stator, the shaft has an axial passageway and is configured and adapted to support the stator from the stationary portion of the conveyor belt support structure, and the electrical lead wires operatively connect to the armature windings and extend through the axial passageway of the shaft.

3. The generator of claim 2 wherein the permanent magnets of the rotor encircle the armature windings of the stator, and the rotor is rotatably supported by the stator via bearings that encircle the shaft of the stator.

4. The generator of claim 1 wherein the generator further comprises a drive dog, the drive dog and the rotor having interlocking geometry that is configured and adapted such that the drive dog can rotationally drive the rotor about the stator, and the at least one drive magnet being fixed to the drive dog.

5. An assembly comprising the generator of claim 1 and the rotating conveyor belt roller, the conveyor belt roller having a shaft, the second axial end of the stator having a recess, a portion of the shaft of the roller being positioned in the recess of the stator, the roller being operatively connected to the rotor in a manner such that rotation of the roller relative to the stator causes the rotor to rotate about the stator, the rotor and the roller each having an outer cylindrical surface of a same diameter.

6. A conveyor belt roller having a main body, at least one permanent drive magnet, and a generator, the main body having a cylindrical outer surface configured and adapted to engage a conveyor belt of a conveyor belt assembly, the cylindrical outer surface defining an axis of rotation, the generator being connected to an axial end portion of the main body, the generator comprising a stator and a rotor, the rotor being configured and adapted to rotate relative to the stator about the axis of rotation, the stator comprising a plurality of armature windings circumferentially spaced around the axis of rotation, the rotor comprising a cylindrical outer surface and a plurality of permanent magnets, the cylindrical outer surface of the rotor and the cylindrical outer surface of the main body being of a same diameter, the plurality of permanent magnets being circumferentially spaced around the axis of rotation, the cylindrical outer surface of the rotor and the permanent magnets encircling the armature windings of the stator, the main body being connected to the rotor in a manner such that rotation of the roller can rotationally drive the rotor relative to the stator, the at least one permanent drive magnet magnetically and operatively connecting the rotor to the main body in a manner creating torsional friction between the main body and the rotor that allows the main body to transfer torque to the rotor, the at least one permanent drive magnet being configured and adapted such that the rotor can rotationally slip relative to the main body when resistive torque between the rotor and the stator exceeds the torsional friction.

7. The conveyor belt roller of claim 6 wherein the stator further comprises electrical wires and a shaft, the electrical wires being operatively connected to and extending from the armature windings, the shaft comprises an axial passageway, and the electrical wires pass through the passageway of the shaft.

8. A method of generating electricity and supporting a conveyor belt roller from a conveyor belt support structure via a generator, the generator comprising a rotor and a stator, the rotor being configured to rotate around the stator, the stator having a center axis and first and second axially opposite ends, the stator being configured and adapted to be supported by and fixed relative to a stationary portion of the conveyor belt support structure from the first axial end of the stator, the method comprising:
   supporting an axial end portion of the conveyor belt roller via the first axial end of the stator;
   supporting the second axial end of the stator from the stationary portion of the conveyor belt support structure in a manner such that the stator indirectly supports the conveyor belt roller from the stationary portion of the conveyor belt support structure, and
   operatively connecting the roller to the rotor via at least one permanent drive magnet in a manner creating torsional friction between the roller and the rotor that allows the roller to transfer torque to the rotor and in a manner such that the rotor can rotationally slip relative to the roller when resistive torque between the rotor and the stator exceeds a torsional friction threshold.

9. A method in accordance with claim 8 wherein the stator comprises armature windings and the rotor comprises a plurality of permanent magnets, and the plurality of permanent magnets encircle the stator and the armature windings.

\* \* \* \* \*